(12) United States Patent
Binek et al.

(10) Patent No.: US 11,685,123 B2
(45) Date of Patent: Jun. 27, 2023

(54) ERODIBLE SUPPORT STRUCTURE FOR ADDITIVELY MANUFACTURED ARTICLE AND PROCESS THEREFOR

(71) Applicant: Raytheon Technologies Corporation, Farmington, CT (US)

(72) Inventors: Lawrence A. Binek, Glastonbury, CT (US); Matthew E. Lynch, Canton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 197 days.

(21) Appl. No.: 17/108,726

(22) Filed: Dec. 1, 2020

(65) Prior Publication Data
US 2022/0168963 A1 Jun. 2, 2022

(51) Int. Cl.
*B29C 64/40* (2017.01)
*B33Y 10/00* (2015.01)
(Continued)

(52) U.S. Cl.
CPC ............ *B29C 64/40* (2017.08); *B29C 64/386* (2017.08); *B33Y 10/00* (2014.12); *B33Y 50/00* (2014.12)

(58) Field of Classification Search
CPC .......... B29C 64/40; B33Y 10/00; B33Y 50/00
See application file for complete search history.

(56) References Cited

U.S. PATENT DOCUMENTS

| 5,924,483 A | 7/1999 | Frasier |
| 7,306,026 B2 | 12/2007 | Memmen |

(Continued)

FOREIGN PATENT DOCUMENTS

| DE | 102015011110 | * | 2/2016 |
| DE | 102015011110 A1 | | 2/2016 |

(Continued)

OTHER PUBLICATIONS

EP Search Report dated May 4, 2022 issued for corresponding European Patent Application No. 21211601.6.
(Continued)

*Primary Examiner* — Nathan T Leong
(74) *Attorney, Agent, or Firm* — Bachman & LaPointe, P.C.

(57) ABSTRACT

A method of constructing an additive manufactured article with erodible support. The method includes computing a length of an overhanging geometry that extends from an inner surface of an additively manufactured article; determining points along the overhanging geometry determining an outside point and an inside point from the multiple of overhanging geometry points; determining an anchor point by moving from the inside point I antiparallel to the build direction by a distance sufficient to form an angle greater than a critical angle of the additive process; connecting the anchor point to the overhanging geometry points to form ligament segments; thickening the ligament segments to form a solid ligament to form the erodible support; and additively manufacturing the overhanging geometry from the inner surface of the additively manufactured article via the erodible support, the erodible support erodible during operation of the additively manufactured article.

12 Claims, 5 Drawing Sheets

(51) Int. Cl.
*B33Y 50/00* (2015.01)
*B29C 64/386* (2017.01)

(56) References Cited

U.S. PATENT DOCUMENTS

| | | |
|---|---|---|
| 7,520,312 B2 | 4/2009 | Memmen |
| 8,066,052 B2 | 11/2011 | Blair |
| 8,291,963 B1 | 10/2012 | Trinks et al. |
| 9,878,369 B1 | 1/2018 | Heneveld et al. |
| 9,915,480 B2 | 3/2018 | Ott et al. |
| 9,925,724 B2 | 3/2018 | Long |
| 10,166,599 B2 | 1/2019 | Castle et al. |
| 10,307,816 B2 | 6/2019 | Slavens et al. |
| 2008/0131285 A1 | 6/2008 | Albert et al. |
| 2013/0266816 A1 | 10/2013 | Xu |
| 2020/0164590 A1 | 5/2020 | Leung et al. |

FOREIGN PATENT DOCUMENTS

| | | |
|---|---|---|
| EP | 2910362 A1 | 8/2015 |
| WO | 2012/131481 A1 | 10/2012 |
| WO | 2018/141476 A1 | 8/2018 |

OTHER PUBLICATIONS

Ramesh et al., "Analysis of Film Cooling Performance of Advanced Tripod Hole Geometries With and Without Manufacturing Features", International Journal of Heat and Mass Transfer, 94 (2016) 9-19, Available online Nov. 28, 2015. (Year: 2015).

Park et al., "Film-Cooling Effectiveness of Antivortex Holes at Three Different Mainstream Turbulence Levels", published online Jun. 29, 2017, Journal of Propulsion and Power, vol. 33, No. 6, Nov.-Dec. 2017, pp. 1561-1569. (Year: 2017).

* cited by examiner

ERODIBLE SUPPORT STRUCTURE FOR ADDITIVELY MANUFACTURED ARTICLE AND PROCESS THEREFOR

BACKGROUND

The present disclosure relates to additive manufacturing and, more particularly, to an erodible support structure for an additively manufactured article and a process therefor.

Additive manufacturing facilitates manufacture of complex components at reduced cost. Support structures are often required for overhanging geometries within a complex component during additive manufacture. In many such complex components, subtractive tool access is not available for later removal of these support structures. This then requires the complex component to be additively manufactured as multiple portions which are then later assembled. This minimizes the cost benefits associated with additive manufacture.

SUMMARY

A method for constructing an additive manufactured article with an erodible support according to one disclosed non-limiting embodiment of the present disclosure includes computing a length of an overhanging geometry that extends from an inner surface of an additively manufactured article; determining a multiple of points along the overhanging geometry at a desired spacing; determining an outside point and an inside point of the multiple of points; determining an anchor point based on the inside point and a vector antiparallel to the build direction by a distance sufficient to form an angle greater than a critical angle of the additive process; associating the anchor point to the overhanging geometry points to form ligament segments; thickening the ligament segments to form an erodible support; and additively manufacturing the overhanging geometry from the inner surface of the via the erodible support, the erodible support erodible during operation of the additively manufactured article.

A further embodiment of any of the foregoing embodiments of the present disclosure includes, wherein the inner surface forms an enclosed chamber.

A further embodiment of any of the foregoing embodiments of the present disclosure includes, wherein the spacing dependent on the additive manufacturing process is less than 0.08 inches (2 mm).

A further embodiment of any of the foregoing embodiments of the present disclosure includes, translating the points along the overhanging geometry antiparallel to an additive build direction to obtain a multiple of overhanging geometry points, wherein translating the points along the overhanging geometry antiparallel to the additive build direction is by a distance p such that $r<=p<=r+t$; where r is the overhanging geometry radius and t is the overhanging geometry thickness.

A further embodiment of any of the foregoing embodiments of the present disclosure includes, wherein the multiple of overhanging geometry points are perpendicular to the build direction along the overhanging geometry.

A further embodiment of any of the foregoing embodiments of the present disclosure includes that the multiple of overhanging geometry points are spaced with respect to a fidelity of the additive manufacturing process.

A further embodiment of any of the foregoing embodiments of the present disclosure includes that the erodible support is upstream of the overhanging geometry.

A further embodiment of any of the foregoing embodiments of the present disclosure includes that the critical angle is between 35-75 degrees.

A further embodiment of any of the foregoing embodiments of the present disclosure includes, locating intermediate points between the anchor point and the overhanging geometry points.

A further embodiment of any of the foregoing embodiments of the present disclosure includes that thickening the ligament segments is defined with respect to a length of each ligament segment, each ligament segments having the smallest diameter where joined with the overhanging geometry.

A further embodiment of any of the foregoing embodiments of the present disclosure includes that thickening the ligament segments comprises defining a diameter less than half the ligament segment length.

A further embodiment of any of the foregoing embodiments of the present disclosure includes that thickening the ligament segments comprises reducing a diameter of each ligament segment toward the overhanging geometry such that the smallest diameter is that which is in contact with the overhanging geometry.

A further embodiment of any of the foregoing embodiments of the present disclosure includes that thickening the ligament segments comprises determining the thickness such that the thickness is inversely proportional to a distance from the anchor point.

A further embodiment of any of the foregoing embodiments of the present disclosure includes that the ligament segments are joined with the overhanging geometry via a blend radius.

An additive manufactured article according to one disclosed non-limiting embodiment of the present disclosure includes an overhanging geometry that extends from an inner surface; and an erodible support connected between the inner surface and the overhanging geometry, the erodible support erodible during operation of the additively manufactured article, the erodible support comprises a multiple of ligament segments that extend from an anchor point on the inner surface.

A further embodiment of any of the foregoing embodiments of the present disclosure includes that the erodible support is upstream of the overhanging geometry with respect to a flow through the additive manufactured article.

A further embodiment of any of the foregoing embodiments of the present disclosure includes that the multiple of ligament segments are joined with the overhanging geometry at a spacing of less than 0.08 inches (2 mm).

A further embodiment of any of the foregoing embodiments of the present disclosure includes that each of the multiple of ligament segments define a diameter less than half a length of that ligament segment.

A further embodiment of any of the foregoing embodiments of the present disclosure includes that the multiple of ligament segments are joined with the overhanging geometry by a distance p such that $r<=p<=r+t$; where r is the overhanging geometry radius and t is the overhanging geometry thickness.

A further embodiment of any of the foregoing embodiments of the present disclosure includes that the inner surface forms an enclosed chamber.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
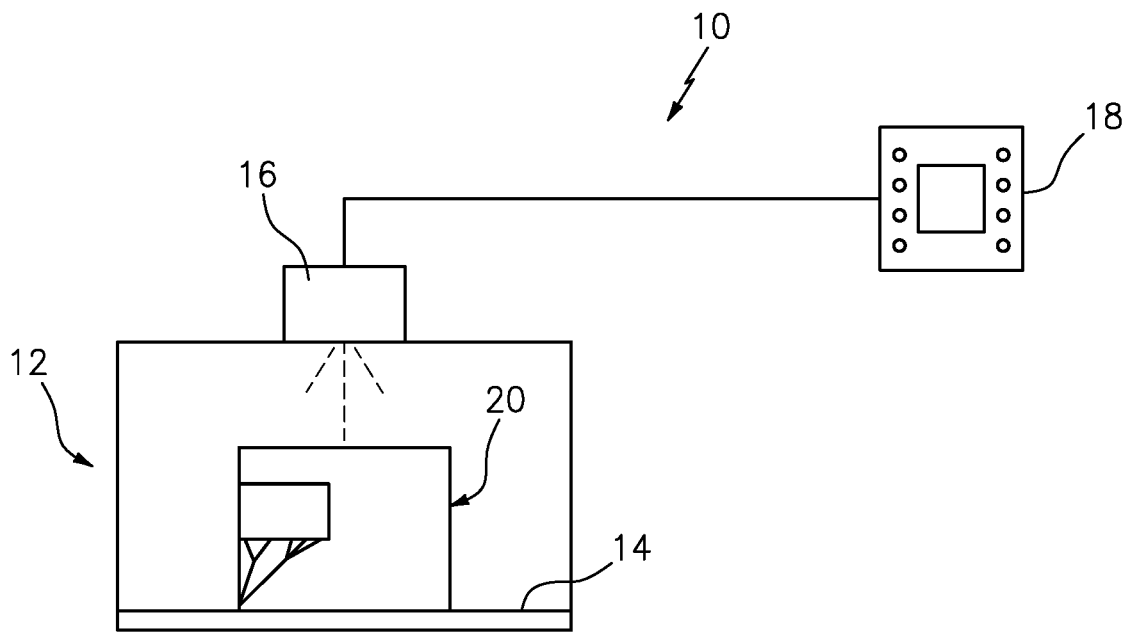
FIG. 1 is a schematic view of an additive manufacturing system.

FIG. 1 schematically illustrates an additive manufacturing system 10. The system 10 includes a build chamber 12 with a powder bed 14, one or more energy sources 16 such as a laser, and a control 18. The control 18 may include a processor, a memory, and an interface. The processor and the interface are communicatively coupled to the memory. The processor may be any type of microprocessor having desired performance characteristics configured to implement various logical operations in response to execution of instructions. For example, instructions may be stored on a non-transitory, tangible, computer readable medium configured to communicate with other components. The memory may be embodied as any type of computer memory device which stores data and control algorithms such as the logic as described herein. The interface is communicatively coupled to hardware, firmware, and/or software components, including the build chamber 12 and energy sources 16 as well as permit electronic communication with a user through a control interface for example, a multifunction display. The control interface permits a user to interact with the system 10, to issue commands and display information such as warnings. In response to execution by the controller, the system 10 performs various operations.

The additive manufacturing system 10 fabricates or grows articles using three-dimensional information of the desired article. The three-dimensional information is converted into a plurality of slices, each slice defining a cross section of the article. The additive manufactured article is then grown slice-by-slice, or layer-by-layer. Each layer may have an example thickness between about 0.0005-0.001 inches (0.0127-0.0254 mm). The additive manufacturing process facilitates manufacture of articles with relatively complex geometries to minimize assembly details, gun-drilling, and other non-unitary component construction features.

Additive manufacturing processes include, but are not limited to, Solid Freeform Fabrication (SFF) processes, 3-D printing methods, Sanders Modelmaker, Selective Laser Sintering (SLS), 3D systems thermojet, ZCorp 3D printing Binder jetting, ExOne ProMetal 3D printing, stereolithography (SLA), Laminated Object Manufacturing (LOM), Fused Deposition Modeling (FDM), Electron Beam Sintering (EBS), Electron Beam Melting (EBM), Electron Beam Powder Bed Fusion (EB-PBF), Electron Beam Wire (EBW), Laser Engineered Net Shaping (LENS), Laser Net Shape Manufacturing (LNSM), Direct Metal Deposition (DMD), Laser Powder Bed Fusion (L-PBF), Digital Light Synthesis™, Continuous Liquid Interface Production (CLIP™), and Layerwise Ceramic Manufacturing (LCM). Other additive manufacturing processes can be categorized as vat photo polymerization, material jetting, binder jetting, material extrusion, powder bed fusion, sheet lamination, directed energy deposition as well as processes performed continuously without discrete layers, such as in Digital Light Synthesis™ or Continuous Liquid Interface Production (CLIP™).

The additive manufacturing process may utilize atomized powder material that include, but are not limited to, Inconel 625 Alloy, 718 Alloy, 230 Alloy, other metal alloys, stainless steel, tool steel, cobalt chrome, titanium, nickel, aluminum, ceramics, plastics and others in atomized powder material form. In other additive manufacturing processes, the starting materials can be non-atomized powders, filled or unfilled resins in liquid, solid or semisolid forms, and wire-based materials as would be used in approaches such as Wire Arc Additive Manufacturing (WAAM) for metals and Fused Deposition Modeling (FDM) for polymers. Nickel alloys may have specific benefit for parts that operate in high temperature environments, such as, for example, environments typically encountered by aerospace and gas turbine engine components.

Figure 2:
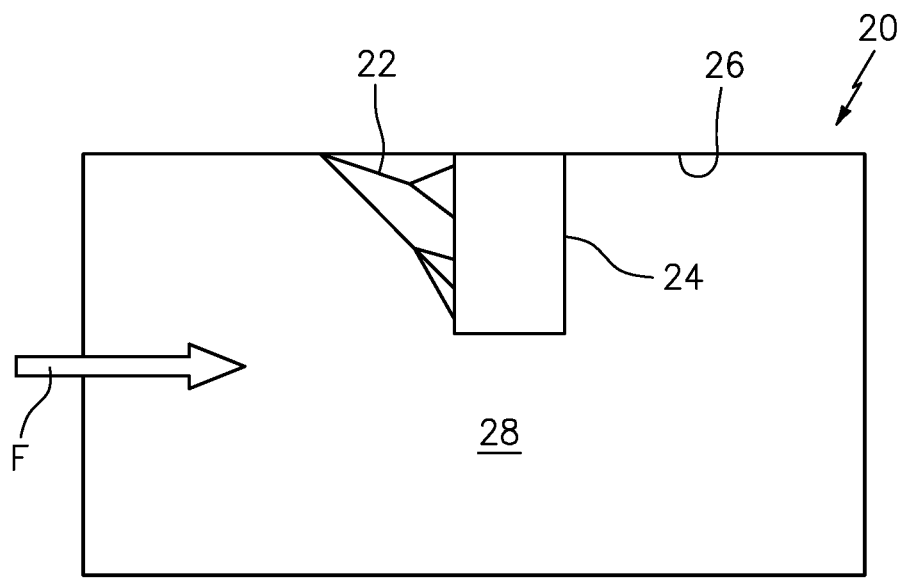
FIG. 2 is a schematic view of an example additive manufactured article with erodible support.

FIG. 2 schematically illustrates an example additive manufactured article 20 with an erodible support 22 that can facilitate cost effective production of attritable applications which are typically used only once. The erosion of the erodible support 22 could be by thermal flow, abrasive flow, or other flow during operation of the article 20. The erodible support 22 facilitates additive manufacture of an overhanging geometry 24 such as dilution chute that extends from an inner surface 26 of the article 20.

The inner surface 26 forms a unitary interior chamber 28 that may not be accessible by subtractive machining tools for final machining. That is, the inner surface 26 of the article 20 forms the unitary interior chamber 28 that, after being additively manufactured, is not otherwise accessible. The unitary interior chamber 28 may, for example, be formed within a combustor, an airfoil, heat exchangers, fuel filters, desulfurization reactors, reformers, igniters, investment castings, lost wax tools, or other component or system that requires various overhanging geometries 24 therein that must be supported during the additive manufactured process. That is, the erodible support 22 can only be removed during later operation of the additive manufactured article 20. The illustrated additive manufactured article 20 is but one example that may benefit from that disclosed herein, but other articles with inaccessible interiors will also benefit herefrom.

In this example, the erodible support 22 is positioned upstream of the overhanging geometry 24 with respect to a flow F such as, for example, an airflow, a high temperature combustion flow, an abrasive, or other flow through the unitary interior chamber 28 during operation. That is, the unitary interior chamber 28 permits flow therethrough but is otherwise enclosed and thus not accessible to tools that permit subtractive machining.

Figure 3:
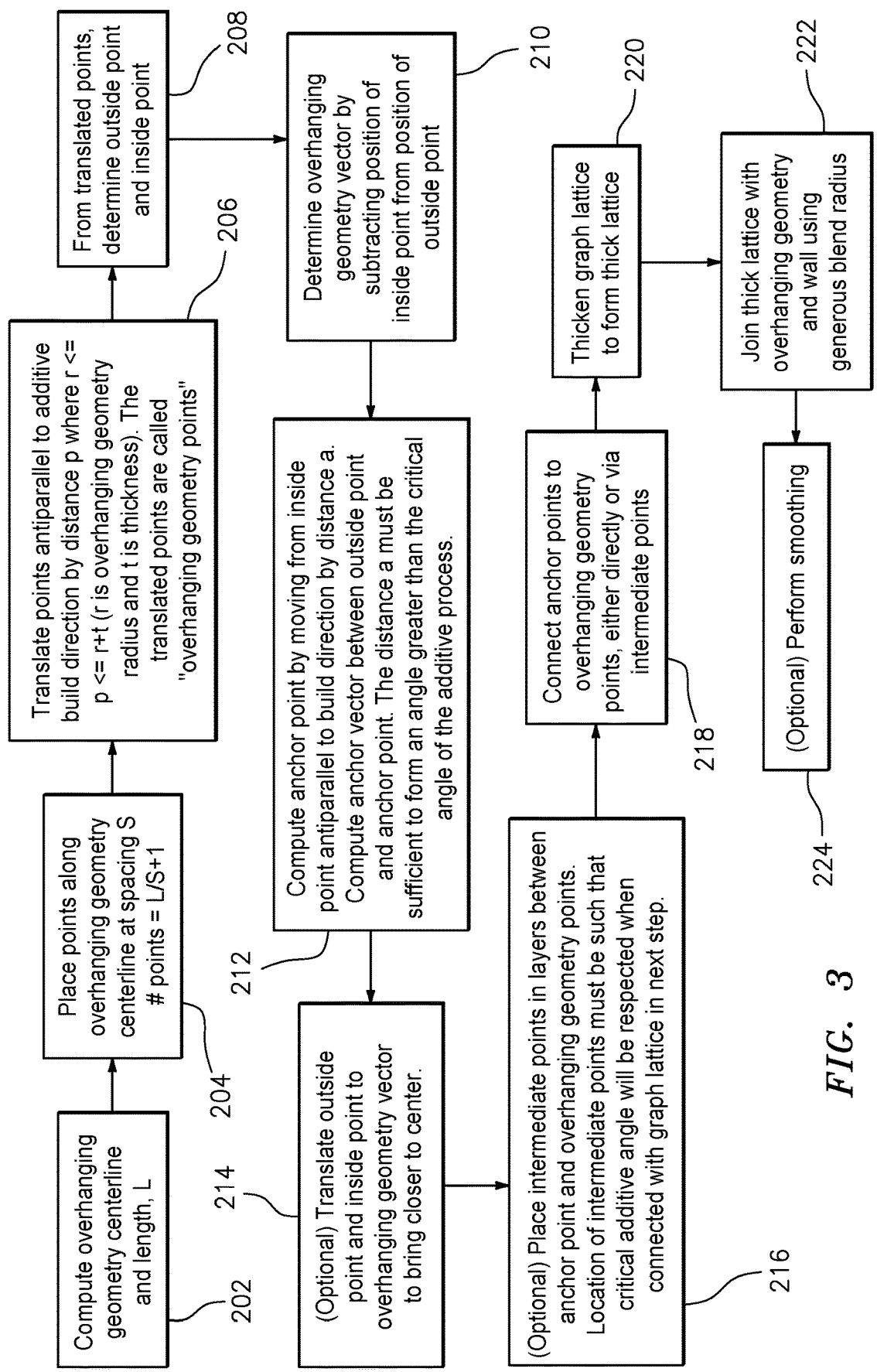
FIG. 3 is a block diagram of a process for additive manufacturing of the example additive manufactured article with erodible support.
Figure 4:
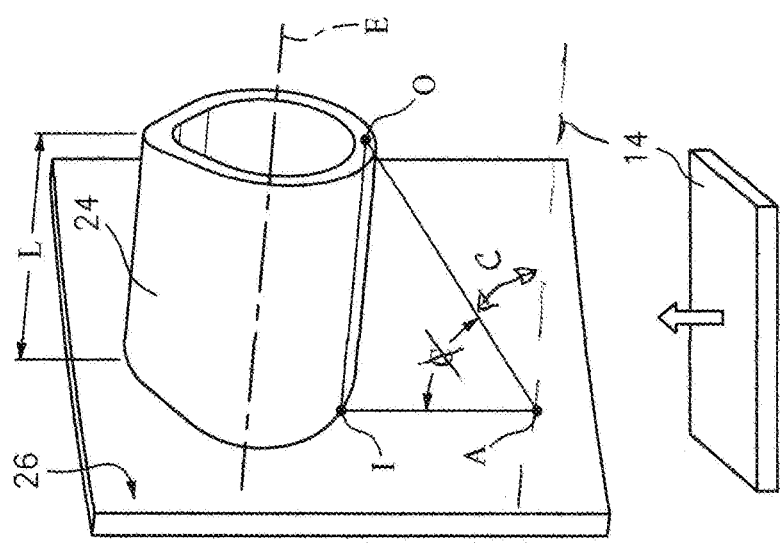
FIG. 4 is a schematic view of one step in the process for determining the erodible support of the additive manufactured article.

With reference to FIG. 3, one disclosed non-limiting embodiment of a method 200 for constructing the additive manufactured article 20 with the erodible support 22 (FIG. 2) is schematically depicted. Initially, a length L of the overhanging geometry 24 that requires support to be additively manufactured is computed along a centerline E (step 202; FIG. 4). Points are then positioned along the overhanging geometry 24 at a spacing S (step 204). The number of points may be equal to 1 plus the length L divided by S. The spacing S depends on the additive manufacturing process and, in one example, is less than about 0.08 inches (2 mm).

Points are then translated by a distance p antiparallel to the additive manufacturing process build direction such that: $r <= p <= r+t$ to define translated points (step 206); where r is the inner radius of the overhanging geometry 24, and t is the wall thickness of the overhanging geometry 24. These points that have been translated by distance p, may also be referred to herein as overhanging geometry points G. The build direction is important because the overhanging geometry points G are set along an overhanging geometry vector along the overhanging geometry 24 parallel to the build plate 14, i.e., perpendicular to the build direction vector. In this embodiment, the build direction vector is equivalent in length to the overhanging geometry vector (FIG. 4).

Next, from the overhanging geometry points G, an outside point O and an inside point I are determined (step 208). The overhanging geometry vector is defined between the inside point I adjacent to the inner surface 26 and the outside point O that is adjacent to a distal end of the overhanging geometry 24. The overhanging geometry vector is determined by subtracting the position of the inside point I from the outside point O (step 210).

Next, an anchor point A is determined by moving from the inside point I by a distance along the wall to form an anchor vector between outside point O and the anchor point A (step 212). The distance may be equivalent to the overhanging geometry vector and must be at least of a length to form an angle greater than a critical angle C of the additive process. For example, the critical angle C is between 15-55 degrees. The anchor point A is located on the inner surface 26 upstream of the overhanging geometry with respect to the flow F (FIG. 2).

Optionally, the outside point O and the inside point I may be translated along the overhanging geometry 24 (step 214). This translation distance permits the points to move away from the inner surface 26 to facilitate later connection of the ligaments so they do not extend past the distal end of the overhanging geometry 24. The translation distance must be less than S.

Figure 5:
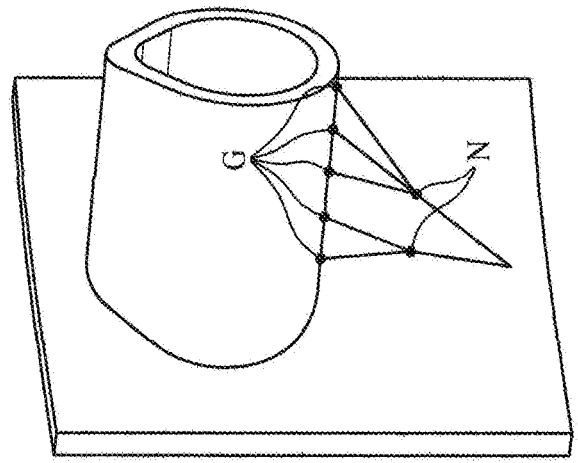
FIG. 5 is a schematic view of one step in the process for determining the erodible support of the additive manufactured article.

Optionally, intermediate points N may be defined between the anchor point A and the overhanging geometry points G (step 216; FIG. 5). The location of the intermediate points N are also defined so that the critical angle is also respected.

Next, the anchor point A is connected to the overhanging geometry points G between the outside point O and the inside point I, either directly or via the intermediate points N to form ligament segments (step 218). That is, the anchor point A is connected to the intermediate points N, then the intermediate points N to the overhanging geometry points G.

Figure 6:
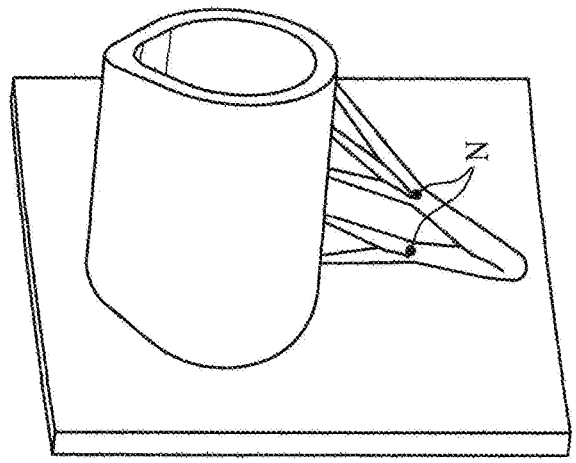
FIG. 6 is a schematic view of one step in the process for determining the erodible support of the additive manufactured article.

Next, the ligament segments are thickened to form segments of additive manufactured material for the erodible support 22 (step 220; FIG. 6). The ligament segments are thickened only to an extent to provide the necessary support for additive manufacture of the overhanging geometry 24 but also to facilitate the later erosion thereof. The diameter of each ligament segment of the erodible support 22 may be, in one embodiment, based on the length of the particular ligament segment. For example, a diameter of each ligament segment of the erodible support 22 is defined as less than half the ligament segment length. In another embodiment, the ligament segments of the ligament segment may each reduce in diameter toward the overhanging geometry 24 such that the smallest diameter is that which is in contact with the overhanging geometry 24. In still another embodiment, the thickness is controlled via a field quantity in which the thickness of each ligament segment is inversely proportional to the distance of the ligament segment from the anchor point A.

Next, the ligament segments of the erodible support 22 are blended to the overhanging geometry 24 to finalize the erodible support 22 (step 222). That is, the intersections of the erodible support 22 are blended to facilitate the additive manufacture process but also to, for example, facilitate erosion during later operation of the additive manufactured article. Optionally, subsequent smoothing of the erodible support 22 may be performed to further facilitate later erosion (step 224).

Figure 7A:
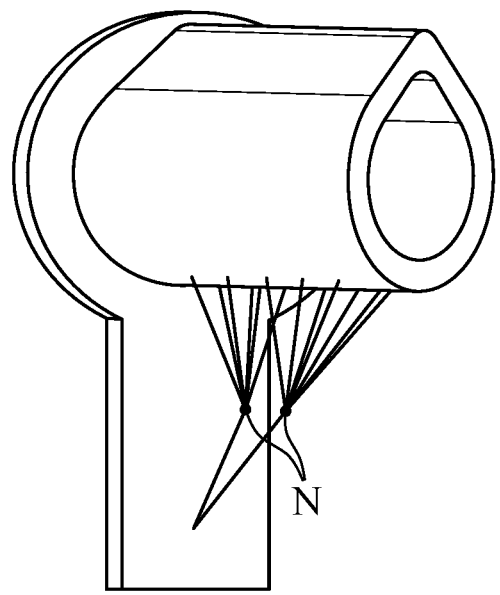
FIG. 7A, 7B and 7C are schematic views of an alternate non-limiting embodiment of the erodible support with ligaments that extend in three planes.
Figure 7B:
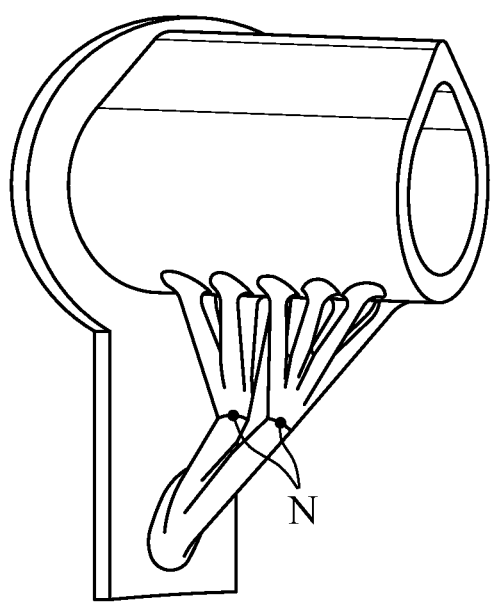
Figure 7C:
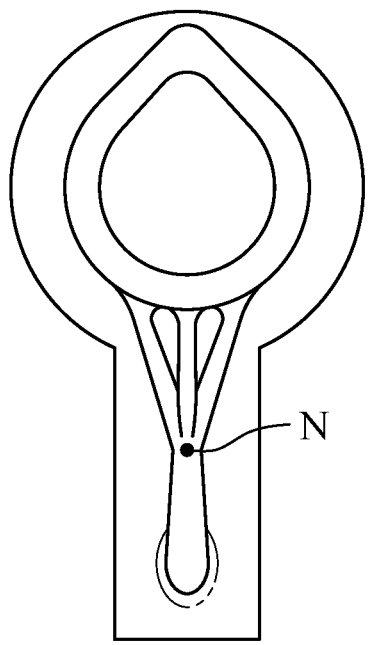

Alternatively, a multiple of ligament segments of the erodible support 22 may branch into multiple planes from the intermediate points N (three shown in FIG. 7A, 7B, 7C) to their respective overhanging geometry points G. For example, the overhanging geometry points G are copied and translated transverse and/or perpendicular with respect to axis.

Figure 8:
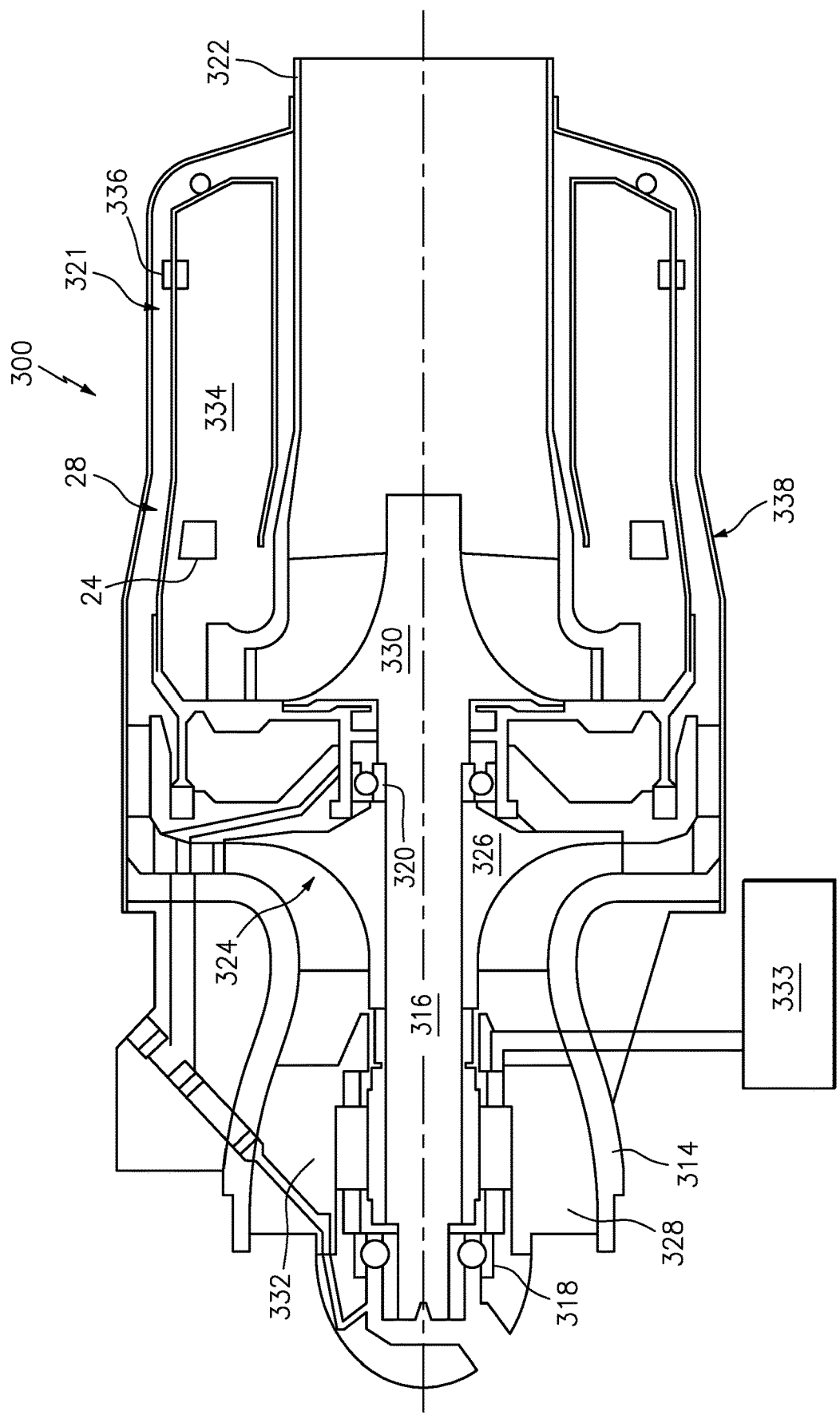
FIG. 8 is a schematic view of one example attritable additive manufactured article with erodible supports.

In one example, an attritable gas turbine engine 300 (FIG. 8) forms the unitary interior chamber 28 and the overhanging geometry 24 forms a dilution passage that extends into the unitary interior chamber 28. The attritable gas turbine engine 300 may include a housing 314, a rotor shaft 316 rotationally mounted to a forward bearing 318 and an aft bearing 320, a combustion system 321, and an exhaust pipe 322. The rotor shaft 316 rotates about a longitudinal axis X. A rotor 324 includes compressor blades 326 facing forward toward an inlet 328 and turbine blades 330 facing rearward toward the exhaust pipe 322 to define a turbine wheel on the rotor shaft 316. The rotor shaft 316 is received in the bearings 318, 320, and is coupled to a fuel pump 332 to provide fuel through a fuel manifold 336 to an annular combustor liner 334 that forms an example of the unitary interior chamber 28. The annular combustor liner 334 contains the example overhanging geometry 24 formed as a dilution passage that extends into the unitary interior chamber 28. A permanent magnet generator 333 is mounted to the rotor shaft 316 to generate electrical power for the engine 300 and other accessories.

The attritable gas turbine engine 300 may include a housing 314, a rotor shaft 316 rotationally mounted to a forward bearing 318 and an aft bearing 320, a combustion system 321, and an exhaust pipe 322. The rotor shaft 316 rotates about a longitudinal axis X. A rotor 324 includes compressor blades 326 facing forward toward an inlet 328 and turbine blades 330 facing rearward toward the exhaust pipe 322 to define a turbine wheel on the rotor shaft 316. The rotor shaft 16 is received in the bearings 318, 320, and is coupled to a fuel pump 332 to provide fuel through a fuel manifold 336 to an annular combustor liner 334 that forms an example of the unitary interior chamber 28. The annular combustor liner 334 contains the example overhanging geometry 24 formed as a dilution passage that extends into the unitary interior chamber 28. A permanent magnet generator 333 is mounted to the rotor shaft 316 to generate electrical power for the engine 300 and other accessories.

The method provides significant time and cost savings by development of additive manufacturing support structures as a function of critical angles and point placement. The thickness of the support ligaments can therefore be optimized for erosion as the support structure provides significant surface area. This permits application of experimental or analytical data concerning erosion (thermal from a combustor or abrasive from AFM systems) directly via field input to the generative design criteria. This allows for an optimized erodible support structure to be generated which can be readily changed if the driving function changes.

The use of the terms a, an, the, and similar references in the context of description (especially in the context of the following claims) are to be construed to cover both the singular and the plural, unless otherwise indicated herein or specifically contradicted by context. The modifier about used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as forward, aft, upper, lower, above, below, and the like are with reference to the normal operational attitude of the vehicle and should not be considered otherwise limiting.

Although the different non-limiting embodiments have specific illustrated articles, the embodiments of this invention are not limited to those particular combinations. It is possible to use some of the articles or features from any of the non-limiting embodiments in combination with features or articles from any of the other non-limiting embodiments.

It should be appreciated that like reference numerals identify corresponding or similar elements throughout the several drawings. It should also be appreciated that although a particular article arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A method for constructing an additive manufactured article with an overhanging geometry and an erodible support for the overhanging geometry, comprising:
   computing a length of the overhanging geometry defined as a structure that extends from an inner surface of an additively manufactured article, wherein the overhanging geometry extends from the inner surface at an angle between a build plane for the method and the overhanging geometry, wherein the angle is less than a critical angle for the additive process, and wherein the critical angle is between 35 and 75 degrees;
   determining a multiple of points along the overhanging geometry at a predetermined spacing;
   determining an outside point and an inside point of the multiple of points, wherein the inside point is a point of the multiple of points that is closest to the inner surface, and the outside point is a point of the multiple of points that is furthest away from the inner surface;
   determining an anchor point on the inner surface such that a vector from the outside point to the anchor point is at an angle with respect to the build plane that is greater than the critical angle of the additive process;
   associating the anchor point to the overhanging geometry points to additively form ligament segments between the anchor point and the overhanging geometry points;
   thickening the ligament segments to form the erodible support; and
   additively manufacturing the overhanging geometry from the inner surface and supported by the erodible support, the erodible support being erodible during operation of the additively manufactured article.

2. The method as recited in claim 1, wherein the inner surface forms an enclosed chamber and the overhanging geometry and the erodible support are inside the chamber.

3. The method as recited in claim 1, wherein the predetermined spacing is less than 0.08 inches (2 mm).

4. The method as recited in claim 1, wherein the overhanging geometry has an inner radius (r) and a wall thickness (t) and further comprising translating the multiple of points along the overhanging geometry by a distance p, wherein r<=p<=r+t; where r is the overhanging geometry inner radius and t is the overhanging geometry wall thickness.

5. The method as recited in claim 4, wherein the multiple of overhanging geometry points are spaced perpendicular to the build direction along the overhanging geometry.

6. The method as recited in claim 1, wherein the additively manufactured article, in use, has a flow direction, and wherein the erodible support is upstream of the overhanging geometry with respect to the flow direction.

7. The method as recited in claim 1, further comprising locating intermediate points between the anchor point and the overhanging geometry points, building the ligament segments from the anchor point to the intermediate points, and then building branching ligament segments from the intermediate points to the overhanging eometry points.

8. The method as recited in claim 1, wherein thickening the ligament segments comprises increasing a diameter of the ligament segments, and wherein each ligament segment a smallest diameter where the ligament segment joins with the overhanging geometry.

9. The method as recited in claim 1, wherein thickening the ligament segments comprises thickening the ligament segments until they have a diameter less than half of a length of the ligament segment.

10. The method as recited in claim 1, wherein thickening the ligament segments comprises reducing a diameter of each ligament segment toward the overhanging geometry such that the smallest diameter is that which is in contact with the overhanging geometry.

11. The method as recited in claim 1, wherein thickening the ligament segments comprises determining the thickness such that the thickness is inversely proportional to a distance from the anchor point.

12. The method as recited in claim 1, wherein the ligament segments are joined with the overhanging geometry via a blend radius.

* * * * *